United States Patent [19]

York

[11] Patent Number: 4,514,697

[45] Date of Patent: Apr. 30, 1985

[54] COHERENT PHASE SHIFT KEYED DEMODULATOR WITH IMPROVED SAMPLING APPARATUS AND METHOD

[75] Inventor: Theodore H. York, Raleigh, N.C.

[73] Assignee: Westinghouse Electric Corp., Pittsburgh, Pa.

[21] Appl. No.: 465,231

[22] Filed: Feb. 9, 1983

[51] Int. Cl.³ .......................................... H04L 27/22
[52] U.S. Cl. ..................................... 329/104; 329/110; 329/126; 375/82; 375/94
[58] Field of Search ............... 329/50, 104, 107, 110, 329/112, 122, 124, 126; 375/80, 81, 82, 83, 84, 85, 86, 87, 94

[56] References Cited

U.S. PATENT DOCUMENTS

| | | |
|---|---|---|
| 3,739,277 | 6/1973 | Schneider et al. . |
| 3,745,250 | 7/1973 | Gerst .............................. 329/110 X |
| 3,815,029 | 6/1974 | Wilson . |
| 4,164,036 | 8/1979 | Wax ..................................... 364/486 |
| 4,174,489 | 11/1979 | Guidoux et al. ................. 364/702 X |
| 4,178,631 | 12/1979 | Nelson, Jr. ........................... 364/484 |
| 4,186,348 | 1/1980 | Lautier et al. . |
| 4,190,802 | 2/1980 | Levine .............................. 329/104 X |
| 4,246,653 | 1/1981 | Malm ..................................... 375/82 |
| 4,246,654 | 1/1981 | Malm ..................................... 375/82 |
| 4,297,533 | 10/1981 | Gander et al. . |
| 4,298,986 | 11/1981 | Hughes .................................. 375/84 |
| 4,308,503 | 12/1981 | Scott ..................................... 329/50 |
| 4,311,964 | 1/1982 | Boykin ................................. 329/104 |
| 4,318,049 | 3/1982 | Mogensen ............................. 329/50 |
| 4,320,345 | 3/1982 | Waggener ............................. 329/50 |

Primary Examiner—Siegfried H. Grimm
Attorney, Agent, or Firm—William D. Lanyi

[57] ABSTRACT

A microprocessor-based coherent phase shift keyed demodulator determines the phase of an incoming carrier signal by analyzing zero-crossings of the carrier derived by polarity sampling of the carrier. The polarity samples are initiated by sample pulses produced in bursts, with each burst being triggered by a single microprocessor interrupt. The sample rate within a burst is an exact multiple of the microprocessor clock frequency and is on the order of the basic microprocessor instruction time.

11 Claims, 6 Drawing Figures

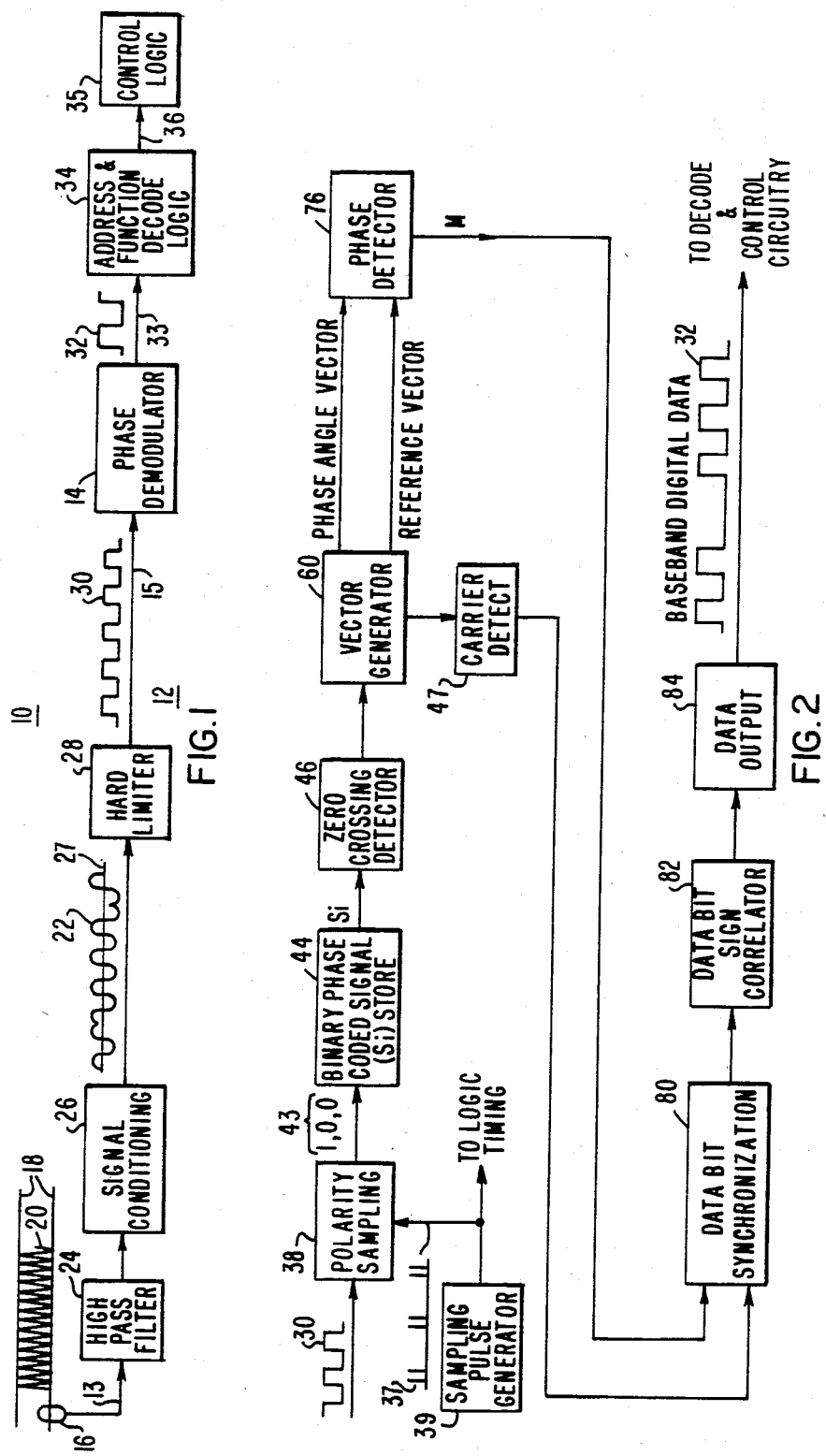

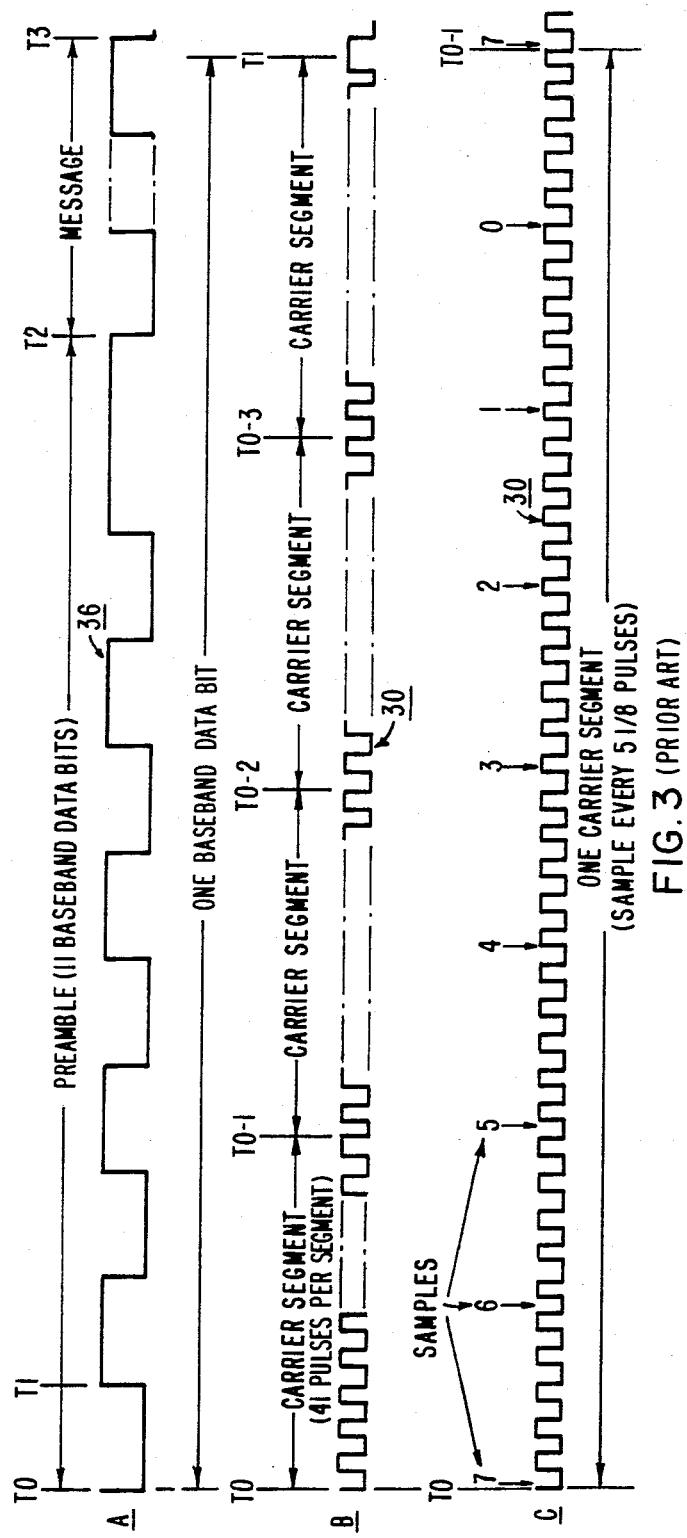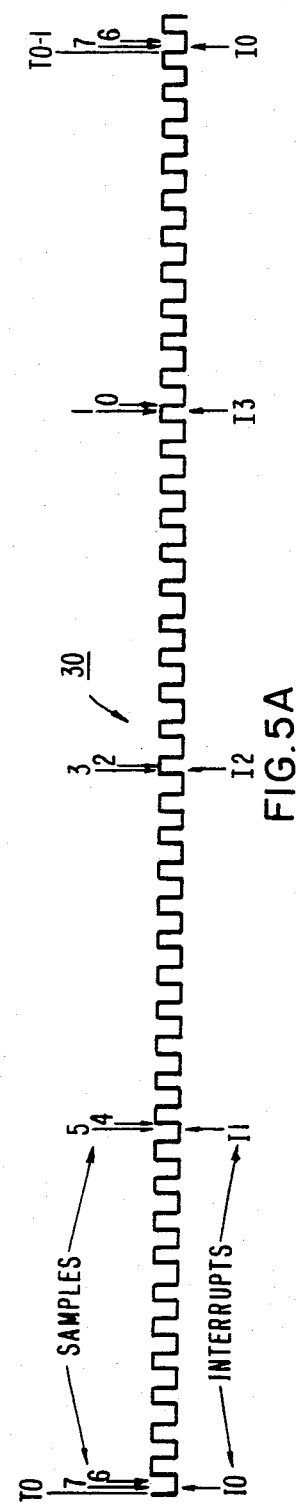

COHERENT PHASE SHIFT KEYED DEMODULATOR WITH IMPROVED SAMPLING APPARATUS AND METHOD

BACKGROUND OF THE INVENTION

1. Field of the Invention

This invention relates to an improved demodulator for use in communication systems employing a binary phase modulated carrier. More particularly, the invention relates to novel sampling apparatus which provides performance and cost advantages.

2. Description of the Prior Art

Coherent phase shift keyed digital modulation techniques are known to be especially suitable for electric utility power line carrier communication systems. The basic task of such systems is to transmit information over the primary and secondary distribution conductors between a central utility location and customer locations. The information may consist of remote meter reading commands, metering data, load shed commands, load status information, and various other data useful in automated distribution systems.

The data is converted at the transmitting end to strings of binary data bits in a predetermined message format. The data bits assume one of two possible states, typically referred to as "mark" and "space" or logic 1 and logic 0. The information, when converted to digital form, is referred to as baseband data.

In order to transmit the message from the source to the destination, the baseband data is modulated onto a carrier signal, generally of much higher frequency, through a coherent phase modulation technique by causing a 180° phase shift of the carrier whenever the baseband data undergoes a transition between mark and space. The modulated carrier signal is then coupled to the power line conductor and propagated to the destination.

A power line communication system employing coherent phase shift keyed modulation is described in U.S. Pat. No. 4,311,964, issued Jan. 19, 1982 to John R. Boykin and assigned to the assignee of the present invention. In the transmitter, the bipolar data bits are phase encoded onto the carrier with identical bit intervals or data symbol times defining a predetermined data rate and are synchronized with the carrier signal so as to be integrally related to the carrier signal frequency. In the receiving apparatus disclosed therein, the modulated carrier is hard limited to produce square wave carrier signals. The polarity of the hard limited carrier signals is then sampled at equal intervals at a sampling pulse rate selected such that the ratio of the sampling rate and the carrier frequency is not an integer. The sampling process enables the demodulator to determine the relative position of the square wave carrier frequency zero crossings. This information is in turn used to derive the phase of the incoming carrier signal relative to an internally generated reference signal. From this information, the demodulator then determines when the phase of the carrier signal undergoes a 180° shift and reconstructs the baseband digital data.

The period of the sampling signal in the demodulator of the aforementioned U.S. patent is normally set to $N \pm 1/m$ cycles of the carrier frequency where N and M are integers. This generates an "image" of the received signal at a reduced frequency of:

$$f_i = \frac{f_c}{N \times m \pm 1}$$

where $f_c$ is the original carrier frequency. The baud rate B is then established by determining the number of cycles K of the image frequency per baseband data bit. Therefore, if K cycles of $f_i$ constitutes one baseband data bit period, then the baud rate is:

$$B = f_c/K(N \times m + 1)$$

For example, a CPSK system having the values $m=8$, $N=5$, $K=4$ yields a baud rate of $B=76.2195$ for a carrier frequency $f_c=12.5$ KHz.

It can be seen that in order to provide a reasonably high baud rate, the values of N, m, and K should be as small as possible. In a microprocessor controlled system, such constraint places a considerable demand on the controlling microprocessor, since it must be interrupted every $N \pm 1/m$ cycles of carrier frequency to produce a sample pulse. For the above listed example with a carrier frequency of 12.5 KHz, an interrupt rate of 2.439 KHz is required.

Another characteristic of CPSK digital demodulators, such as described in the aforementioned patent, is a sensitivity to incoming signals having frequencies other than the desired carrier frequency. These additional frequencies to which the demodulator responds are called aliasing frequencies, and are the frequencies which produce the same image frequency for other valid denominators in the equation:

$$f_i = \frac{f_c}{m \times N \pm 1}$$

where N is constant. In the example given above:

$$f_i = \frac{12500}{8 \times 5 + 1}$$

Therefore, aliasing frequencies fa occur at:

$$f_a = \frac{12500}{8 \times 5 + 1} \times (8 \times 5 - 1) = 11,890.2439 \text{ Hz}$$

and all solutions to the equation:

$$f_a = 12,500/41 \times (8 \times N \pm 1)$$

for integer values of N unequal to 5.

To a limited extent, the sensitivity to aliasing frequencies can be reduced by proper filtering techniques, but it has the effect of reducing the performance of the demodulator under high noise conditions. By increasing the sampling rate, it is possible to improve the performance of the demodulator to permit detection of a weaker carrier signal in the presence of high noise levels. However, increasing the sampling rate raises the interrupt rate for the microprocessor, and the point is rapidly reached where performance is limited by computing capabilities of the microprocessor. It would therefore be desirable to provide a CPSK digital demodulator having a higher effective sampling rate without increasing the processing demands of the microprocessor. Furthermore, it would be desirable to provide a digital demodulator having a reduced sensitivity to aliasing frequencies.

SUMMARY OF THE INVENTION

In accordance with the principles of the present invention, there is provided a coherent phase shift keyed digital demodulator and method of coherent phase demodulation for detecting binary data symbols phase encoded in a sinusoidal carrier. The carrier is hard limited at the receiver to produce a train of rectangular wave signals at the carrier frequency having phase encoded data bits, with identical baud intervals or data symbol times defining a predetermined data rate. The baud rate is synchronized with the carrier signal so as to be integrally related to the carrier signal frequency. The polarities, or levels, of the hard limited carrier signals are sampled to produce an identically phased image signal of the incoming carrier signal. The phase of the image signal is then compared to an internally generated reference signal to produce a logic output signal, the state of which is representative of the logic state of the baseband data present in the modulated carrier signal.

The sampling process is characterized by samples which occur in a burst mode, in which the time intervals between adjacent samples are not necessarily equal. A burst of P samples are taken at each microprocessor interrupt, with the samples in each burst being spaced at intervals of 1/m cycles of carrier frequency. The next interrupt occurs N+P/m cycles after the previous interrupt, thus successive samples in adjacent bursts occur at intervals of N+1/m cycles of carrier frequency. For K cycles of image frequency per baseband data bit and for a given number of J interrupts per baseband data bit time:

$$\sum_{i=1}^{J} \left( N_i + \frac{P}{m} \right) = K \times (m \times N + 1)$$

For example, for K=4, m=8, N=5, and P=2, then J=(K×m)/2=16, and $N_i$=10 for all values of i. In other words, the interval between interrupts is constant for this example, but this is not required to use the invention. By providing a burst of two samples per interrupt, the same sampling rate is maintained as in the demodulator disclosed in the aforementioned U.S. Pat. No. 4,311,964, thereby producing essentially the same performance. However, the interrupt rate is reduced by one-half, allowing the use of a less powerful microprocessor.

Where it is not necessary to reduce the burden on the microprocessor, the same burden may be used in the above example with P=4 to double the sampling rate and thereby increase the performance. In this second example, J is again equal to (K×m)/2, but $N_i$ varies, with $N_i$=9 for four values of i and $N_i$=10 for all other values. In other words, for the second example, the intervals between interrupts are not constant, but are related such that the sampling process still generates a faithful image signal of the carrier. This gives an improvement in performance of about 2 db by increasing the number of samples/bit over which noise is averaged plus the decreased sensitivity to aliases in Gaussian noise without significantly increasing the computational burden on the microprocessor.

These and other aspects and advantages of the present invention will be apparent from the description of the preferred embodiment as shown in the drawings briefly described hereinafter.

BRIEF DESCRIPTION OF THE DRAWINGS

FIG. 1 is a block diagram of a communications terminal including a coherent phase demodulator made in accordance with the present invention;

FIG. 2 is a block diagram of the demodulator shown in FIG. 1;

FIG. 3 includes graphs A, B, and C illustrating baseband data signals and prior art sampling techniques;

FIG. 5A is a graph similar to FIG. 3C showing the sampling techniques incorporated in the present invention.

DESCRIPTION OF THE PREFERRED EMBODIMENT

Figure 4:
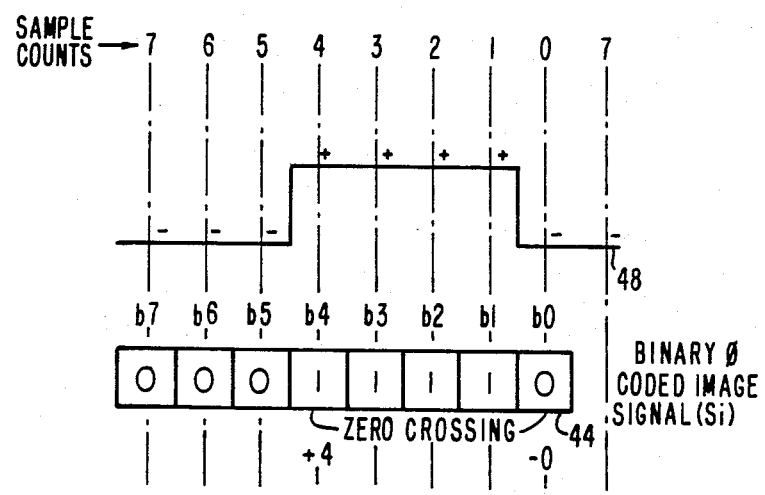
FIG. 4 is a graph showing the construction of a binary phase coded image signal from a group of polarity sample bits obtained by sampling of the phase modulated carrier signals.

Referring now to the drawings, and more particularly to FIG. 1, there is shown a communications terminal 10 including a receiver 12 provided between a power line carrier input 13 and a coherent phase demodulator 14 having an input 15 and made in accordance with the present invention. Before describing the demodulator 14, the characteristics of the communication signals to be processed by the receiver 12 and phase demodulator 14 will be described to provide a better understanding of this invention. The receiver 12 is generally similar to that described in the previously mentioned U.S. Pat. No. 4,311,969, but includes an improved phase demodulator 14.

The communications terminal 10 is intended, in one preferred embodiment, to be connected to a coupler 16 which is mounted in signal communication with at least one of the power line conductors 18. Such conductors are typically used by electric utilities to supply fifty or sixty Hz. electric power to customer locations having the communications terminal 10. The coupler 16 is responsive to a power line carrier 20 transmitted over the conductors 18 and intended to be received by the receiver 12. The carrier 20 is phase modulated with digital data to be recovered by the phase demodulator 14 of this invention.

As is well known, the transmission of the carrier 20 in a power line communications system combined not only the carrier and the sixty Hz. power, but also various interfering signal noise and extraneous signal frequencies. Furthermore, various and random attenuation and impedance characteristics at the carrier frequencies of interest can be introduced in distribution system power line conductors 18 by associated distribution equipment such as distribution transformers and power correction capacitors.

The phase demodulator 14 is intended for operation in a coherent phase shift keyed (CPSK) carrier communication system which causes binary data to produce phase changes in a single sinusoidal carrier signal or tone. The carrier waveform designated by the numeral 22 in FIG. 1 is a substantially ideal recovered form of the carrier 20 on the conductors 18, which is phase reversal modulated with bipolar baseband data bit message symbols which form a data transmission to be received by the terminal 10. Each data bit is coded as a zero (i.e. nominal) phase of carrier frequency or as a 180° phase reversal of the carrier frequency. Although the invention is described in conjunction with a phase reversal system employing two permissible phase states of the carrier, it is to be understood that the invention is not so limited and may be used in quadrature CPSK systems employing four permissible phase states, or in systems employing other numbers of permissible phase states. The data bits are synchronized with the carrier frequency, such that equal baseband data baud intervals are provided which include equal numbers of cycles of the carrier so as to define a predetermined data baud rate. Although the baud rate is synchronized to the carrier, neither the data baud rate nor the carrier frequency is required to be synchronized nor have any predetermined harmonic or subharmonic frequency relationship with the electric power frequency or any other synchronizing frequency or signal source for operation of the demodulator 14 in accordance with the present invention. By way of example and not limitation, one preferred range of carrier frequencies is about 9 to 15 KHz and one exemplary carrier signal frequency described herein is 12.5 KHz.

The general requirements of the receiver 12 and the phase demodulator 14 are to detect the presence of the carrier waveform 22 in the carrier signals 20 of the power line conductors 18, to determine the phase of the carrier signal with respect to a phase reference, to provide synchronization with the beginning and end of each message symbol or data bit interval thereof, and to correlate the transmitted polarity or binary logic state of each carrier data bit. To fulfill these requirements, the receiver 12 is adapted to distinguish the carrier 22 frequency in the presence of the typical noise associated with transmission of the 60 Hz electric power and the extraneously induced noise of power line conductors 18. A high pass filter 24 is provided to initially reject sixty Hz power frequencies and to pass a carrier frequency of interest. A signal conditioning unit 26 further filters, conditions, and amplifies the received signals so as to produce the substantially single frequency carrier waveform 22 with binary phase modulated data information coded therein. The circuit 26 typically includes a low pass filter to reject frequencies slightly above the carrier frequency and a diode clipper to remove spurious noise impulses. A further bandpass filter is included in the circuit 26, which in one preferred embodiment, has a bandpass bandwidth of approximately four hundred Hz with a center frequency of 12.5 KHz. Accordingly, the output of the circuit 26 is substantially the same sinusoidal carrier as initially transmitted or injected onto the conductors 18 in the presence of low noise. A zero reference axis 27 defines the positive and negative half cycles of the sinusoid carrier waveform 22.

The reconstituted carrier waveform 22 is applied to a hard limiter circuit 28 where the carrier signal is amplified and hard limited between about five volts DC and ground. This produces a train of square or rectangular wave hard limited carrier signals 30, applied to demodulator input 15. The instantaneous high and low states of the signals 30 correspond to the positive and negative cycles of the carrier waveform 22. The carrier signal frequency and all of the phase reversal keyed data information originally modulating the carrier phase characteristics is found in the signals 30. The transitions of the signals 30 between the high voltage and low, or zero, voltage levels correspond to the carrier sine wave 22 passing between positive and negative half cycles or phases to cross at its zero axis 27.

The phase demodulator 14 processes the hard limited signals 30 in predetermined fragmentary portions or segments of the carrier. The segments (shown in FIG. 3) of the signal 30 are sampled to produce binary phase coded image signals ($S_i$) by operation of the phase demodulator 14. Thus, a carrier segment is, by analogy, a fragment or "chip" portion broken away from the carrier, and a phase image or replica is derived therefrom for processing to determine its phase angle characteristics. Each carrier segment, or chip, produces one cycle of image signal. In the broad general aspects of synchronizing the demodulator for coherent operation, polarity samples of each carrier segment are converted to relative phase angles in the form of a vector signal representative of the phase of that segment of the carrier signal 22. A reference vector is also generated, using for example, the double frequency vector technique described in the aforementioned U.S. Pat. No. 4,311,964 or the vector reversing technique described in U.S. patent application Ser. No. 465,232 which was filed on Feb. 9, 1983 and is assigned to the assignee of the present application. Correlation signals derived from comparisons of the phase angle signal and phase reference signal in a phase detector are summed, compared, and processed to accomplish carrier synchronization, data bit synchronization, and data bit polarity ambiguity resolution, thus producing reconstituted binary data signals 32 at demodulator input line 33. The binary logic ones and zeros of the signals 32 represent the same baseband digital data information as included in the transmitted carrier information. The data signals 32 are applied to decode and control logic circuits which may have one or more of the functions as generally described in U.S. Pat. No. 4,130,874, issued Dec. 19, 1978, for a load management terminal having plural selectable address formats for a power line communication system.

Referring now to FIG. 2, there is shown a functional block diagram of the improved phase demodulator 14 which is described in connection with its operation to process the signals shown in FIG. 3. The graph A in FIG. 3 shows a time graph of the logic states of binary baseband data message signals 36 which are used to produce the modulated carrier waveform 22. The beginning of each message includes a preamble (shown between times T0 and T2) of eleven data bits which includes nine alternate data bit zero's and data bit one's to provide synchronizing data bits. These are followed by two consecutive data bit ones which form polarity indicator data bits.

Time T2 represents the end of the preamble and the beginning of the information data portion of the transmission message. The overall length of the message is typically on the order of forty to two hundred data bits in length. The baseband data signals 36 originate at a transmitter, not shown, and are used to phase reversal key (modulate) a nominal carrier frequency to produce the phase modulated carrier.

The graph B in FIG. 3 illustrates, in an expanded view, one carrier data bit interval between times T0 and T1 in the hard limited carrier signals 30 of FIGS. 1 and 2. Each equal carrier data symbol interval begins and ends at a point where a phase reversal of the carrier signal occurs if the binary state of the baseband data bit changes from that of the previous data bit. The initial portion of the preamble includes alternate polarity data bits to establish synchronization in the phase detector 14 as will become more apparent from the description. Four of the aforementioned carrier segments are included within each data symbol interval and are delineated by times T0, T0-1, T0-2, T0-3, and T1. The carrier segments are actually formed by the demodulator 14 after polarity sampling operations and storage of a predetermined number of the polarity samples within the demodulator 14. A data symbol interval is equal to the four carrier segments.

Figure 5B:
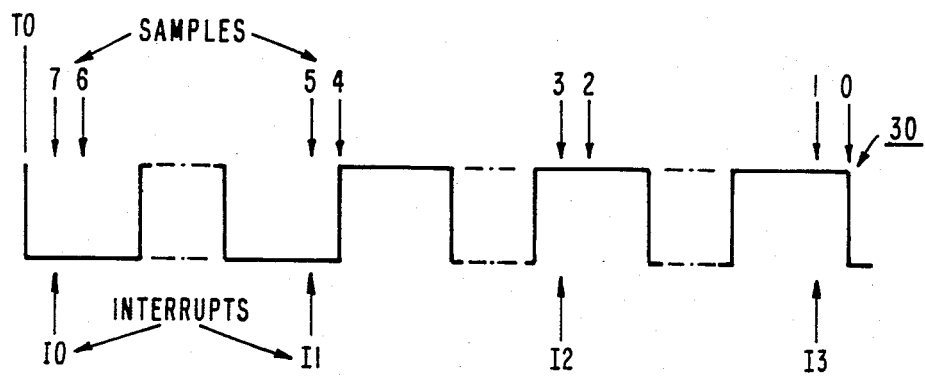
FIG. 5B is an expanded graph of a portion of FIG. 5A.

In graph C of FIG. 3, one of the four segments of graph B is shown in a further expanded view and includes the times of eight samples produced by sampling pulses 37 provided in the prior art phase demodulator 14 of U.S. Pat. No. 4,311,964. FIGS. 5A and 5B show expanded views of a segment similar to Graph C, but includes the times of samples produced by the phase demodulator 14 constructed according to the principles of the present invention.

As can be seen in Graph C of FIG. 3, the sampling pulses produced in the prior art phase demodulator are evenly spaced and are generated with equal time intervals between each sample. Each sample interval is defined by an equal integral number of complete carrier frequency cycles plus a predetermined fraction of a cycle. In the aforementioned prior art demodulator, the sampling interval is equal to $5\frac{1}{8}$ cycles of carrier frequency to effectively sample every 45° of one complete cycle, or 360° of the carrier signal, but at a low sampling rate of 2439 Hz. With four carrier segments of eight sampling pulses each per baseband data bit, there are 32 equally spaced prior art sampling pulses for each data bit. At the carrier frequency of 12.5 KHz this provides a data bit transmission rate of 76.2 bits per second. With the sampling rate specified, 164 cycles of carrier frequency occur during each baseband data bit interval shown in graph B of FIG. 3, and 41 cycles of carrier frequency during each carrier segment. The polarity samples of the hard limited carrier signals 30 are used to determine the times and directions of zero crossings of the carrier waveform 22, thus defining the phase angle thereof to derive the baseband data information which was phase modulated onto the carrier.

The actual sampling process consists of determining the polarity of the square wave carrier frequency signals 30 at the instant of each sampling pulse. The sampling process produces a series of binary polarity indicating sample signals 43 (FIG. 2), with positive and negative carrier polarity indications represented by a bit stream of logic ones and logic zeros, respectively. The polarity indications 43 are sequentially stored in an eight-bit cell storage register indicated as the binary phase coded image signal $S_i$ store block 44 in FIG. 2. The storage of the group of eight-bit sample signals 43 generates and established one binary phase coded signal which is developed during the sampling of one carrier segment to complete effective sampling of one full cycle of the carrier. As can be seen in Graph C of FIG. 3, the prior art sample pulses effectively "march across" the carrier signals 30, with each successive sampling pulse occurring at an equal interval of $\frac{1}{8}$ of a cycle later in the carrier waveform. After 41 cycles of carrier frequency, the eight sampling pulses have produced a series of eight polarity indication bits b7-b0 (FIG. 4) stored as an 8-bit signal $S_i$ used to generate one cycle of an image signal 48 corresponding to the carrier frequency waveform, but at a much lower frequency.

Any polarity indicator bit transitions (that is, from a positive polarity to a negative polarity) between, for example, sample bit b1 and sample bit b0 indicate that a zero crossing of the image 48 derived from the carrier waveform 22 occurred between the corresponding sample pulse times. The binary phase coded signals designated $S_i$ are thus temporarily fixed stationary phase images of the carrier segments. Accordingly, when adjacent polarity indicator bits are different in a data word constituting the signal $S_i$, this is an indication of a zero crossing (ie. change in signal polarity) of the image signal.

Each of the sample bit positions within the signal $S_i$ is indicated by an octal number b7 to b0, corresponding to the most significant bit (MSB) to the least significant bit (LSB) of a binary register within the demodulator apparatus. The sample bit positions b7 to b0 also correspond to sample pulse numbers 7 to 0 for each carrier segment as shown in FIG. 3C. The polarity indicator bits of the signal $S_i$ are compared to determine adjacent bit transitions from positive to negative or vice versa by a zero crossing detector 46 which determines the octal count of the sampling pulses which bracket the transition and whether the polarity transition was positive or negative, that is, a logic zero to a logic one, or a logic one to a logic zero.

The process of building the $S_i$ data word will now be described. Referring to FIG. 3C, it can be seen that the sample pulse indicated as 7 near time T0 determines that, at that instant, the carrier signal 30 is negative. Accordingly, a polarity indication of zero is produced by the polarity sampling circuit 38 and stored in bit position b7 of the image signal $S_i$ store block register 44 (FIG. 4). Similarly, the sample pulse labeled 6 in FIG. 3C tests the polarity of the carrier signal 30 at a point $5\frac{1}{8}$ cycles or 45° later than that of sample pulse 7. Again, the polarity of the carrier signal 30 at the time of sample pulse 6 is negative. Accordingly, the polarity indicator bit is again a logic zero which is stored in bit position b6 of the binary phase coded image signal $S_i$ register 44. The same is true for the polarity of the carrier signal 30 at the instant of sample pulse 5, and a logic zero is also stored in bit position b5 of the signal $S_i$ register 44 of FIG. 4. At the next sample pulse 4, which is retarded 45° in the waveform from that of sample pulse 5, the polarity of the carrier signal 30 is positive. Accordingly, the polarity indicator bit produced by sample pulse 4 is a logic one, which is stored in bit position b4 of the binary phase coded image signal $S_i$ 44 of FIG. 4. In a similar manner, each successive sample pulse produces a polarity indicator bit which is stored in the corresponding bit position of the $S_i$ signal register 44. From these polarity indicator bits, it can be seen in FIG. 4 that a square wave image signal 48 can be reconstructed by the zero crossing detector 46 which is an accurate representation of the phase of the carrier signal 30, by determining the relative position of a zero crossing of the signal 30. The signal 48 shown in FIG. 4 is a portion of a cycle of the 2439 Hz. image signal which is derived from the 12.5 KHz square wave carrier signal 30 by the sampling process.

As is explained in greater detail in U.S. Pat. No. 4,311,964, the phase of the image signal 48 (which is the same as the carrier signal 30) derived from the zero crossing information determined in the manner just described, is used by a vector generator 60 to produce a double frequency vector which is averaged over a period of several carrier segments and divided to produce a phase reference vector representative of the nominal phase of the carrier signal 30. The vector generator 60 of FIG. 2 also generates a phase angle vector representative of the phase of one segment of the carrier signal 30. These two vectors are then compared in phase detector 76 of FIG. 2 to produce a correlation signal M at the output 77 of phase detector 76. The signal M is then processed by a data bit synchronization circuit 80 to determine the beginning and end of a baseband data bit which was modulated onto the carrier signal 30. When proper synchronization is accomplished, the signal M will assume either large positive values or large negative values. A large positive value of M indicates that the phase angle vector is very close to the phase of the phase reference vector, and a large negative value of M indicates that the phase angle vector is close to 180° away from the phase of the phase reference vector.

The output of the data bit synchronization circuit 80 is supplied to a data bit sign correlator 82 which determines whether the nominal phase of the carrier 30 or the 180° phase shifted reverse phase of the carrier signal 30 represents a baseband data one. This information is then processed by a data output circuit 84 to produce a faithful representation 32 of the baseband digital data originally modulated onto the carrier signal 30 by the transmitter. This data is then sent to message decode and control circuitry of the terminal 10 to produce the desired control action represented in the baseband data.

The described prior art demodulator is implemented in a microprocessor based system described in greater detail in the aforementioned U.S. Pat. No. 4,311,964 and includes a microcomputer of the 6800 series available in commercial quantities from Motorola Semiconductor Products, Inc. The sampling pulses 37 are generated by an oscillator circuit and selectively applied through the data I/O ports of the microcomputer to the non-maskable interrupt NMI input of the central processing unit. Thus, each sampling pulse requires a separate interrupt to properly execute the polarity sampling function. As is well known, the processing of an interrupt in a microcomputer requires the execution of a certain number of "housekeeping" or overhead instructions. When it is desired to increase the performance of the demodulator by increasing the sampling rate, the point is rapidly reached where the processing of interrupts associated with each sampling pulse is limited by the maximum processing capability of the microprocessor.

The present invention is also preferably implemented in apparatus incorporating a microprocessor. Furthermore, the present invention employs a polarity sampling technique as does that described in connection with the prior art. However, the present invention provides that successive samples are spaced $L+1/m$ cycles of carrier frequency apart, where L and m are integers and m is preferably chosen such that $1/m$ cycles of carrier frequency is an exact multiple of the microprocessor clock. $1/m$ cycles is furthermore on the order of the instruction time of the microprocessor. The interval between successive pulses, however, is not necessarily equal, in that the value of L is permitted to change between successive sample pulses. In a preferred embodiment of the invention, the sample pulses are produced in bursts of P samples, with the interval between each sample pulses within a burst being $1/m$ cycles apart. In other words, for the sample pulses within a burst, L equals zero, and for adjacent pulses in different bursts L is some integer N.

Each burst of sampling pulses requires only a single interrupt, and the interrupt intervals are thus established in the present invention to be equal to $N_i + P/m$ cycles of carrier frequency such that for J interrupts per baseband data bit time:

$$\sum_{i=1}^{J} \left( N_i + \frac{P}{m} \right) = K \times (m \times N + 1)$$

where
K = Number of cycles of image signal per baseband data bit;
m = Number of sampling pulses needed to cover 360° of carrier signal waveform to construct a single cycle of image signal;
N = Number of complete cycles of carrier signal between interrupts;
P = Number of samples per burst.

This is a concise way of expressing the concept that the number of carrier frequency cycles summed over J interrupts, is equal to the number of carrier cycles per baseband data bit interval.

In one preferred embodiment, K = 4, m = 8, N = 5 and P = 2 and the sample pulses occur as shown in FIG. 5A. Then $J = K \times m/2 = 16$. Thus, $N_i$ equals 10 for all values of i.

This can be seen in FIG. 5A which, in a manner similar to FIG. 3C, shows a train of signals 30 subjected to sample pulses 7 through 0 corresponding to similarly labelled sample pulses in FIG. 3C. However, the eight sample pulses of FIG. 5A occur in four bursts of two pulses, with each burst initiated by a corresponding interrupt I0 through I3. Sample pulses within each burst, such as the sample pulse 7 and 6, are separated by ⅛ cycles of carrier frequency. Successive samples in adjacent bursts, such as sample pulses 6 and 5 are separated by 10⅛ cycles of carrier frequency. The relative position of sample pulse 7 through 0 on the waveform of signal 30 can be seen more clearly in FIG. 5B which shows portions of FIG. 5A in expanded form.

In other words, in the above-described embodiment, there are two sampling pulses produced by each interrupt. This reduces the interrupt rate of the microprocessor by one-half over the prior art demodulator described in the aforementioned U.S. patent which employs equal intervals between sampling pulses, yet the sampling rate remains the same. Therefore, the described embodiment allows the use of a slower, lower cost microprocessor having less processing capability. Performance of the disclosed embodiment is equal to or better than the prior art demodulator of the aforementioned patent, depending on the type and degree of noise present on the transmission channel.

In a preferred embodiment of the present invention, the various functions of the demodulator just described are implemented in a 6803 microprocessor available in commercial quantities from Motorola. The clock frequency of the 6803 microprocessor is 1 MHz. With m = 8 and a carrier frequency of 12.5 KHz, it can be seen that ⅛ cycles of carrier frequency equals 10 μsec, which is exactly 10 times the 1 μsec period of the microprocessor clock. Since the instruction times of the 6803 microprocessor is 2 to 10 μsec, it can be seen that $1/m$ cycles of carrier frequency (i.e., the interval between sample pulses) is on the same order as the instruction time. This is important when the timing between successive samples within a burst is established by successive instructions in the microprocessor. Longer instructions would not allow microprocessor control of the sample burst. Shorter instruction times would force the addition of otherwise unnecessary instructions in the sampling routine, destroying the advantage of reduced microprocessor loading generated by the reduced interrupt rate.

If it is desired to provide a digital demodulator having increased performance with the same microprocessor burden, an alternative embodiment is employed similar to the previously described embodiment, with the exception that P=4. Thus, the sampling rate is effectively doubled to provide increased performance, yet the interrupt rate is the same. In this alternative embodiment, J again is equal to $K \times m2 = 16$, but $N_i$ varies. $N_i=9$ for every fourth value of i and $N_i=10$ for all other values. In other words, there are $9\frac{1}{8}$ cycles of carrier frequency between the last sample pulse of one burst and the first sample of the next burst for some bursts, and $10\frac{1}{8}$ cycles of carrier frequency between samples of adjacent bursts for others. This gives an improvement in performance of approximately 2 dB without significant increases in the computational load on the microprocessor.

Although the invention has been described above in a preferred embodiment and in a single alternative embodiment, it will be understood by those skilled in the art that other alternatives and modifications may be made without departing from the spirit and scope of the invention.

I claim:

1. A demodulator for recovering baseband digital data modulated onto a phase shift keyed carrier signal, comprising:
   means for producing sampling pulses;
   means for producing polarity sample bits indicative of the polarity of the carrier signals at the instant of each sampling pulse;
   means for analyzing said polarity sample bits to establish a phase reference signal indicative of the nominal phase of said carrier signal;
   means for analyzing said polarity sample bits to establish a phase angle signal representative of the present phase of said carrier signal; and
   means for comparing said phase reference signal and said phase angle signal and for reproducing the logic state of the baseband digital data according to the difference between said phase reference signal and said phase angle signal;
   said pulse producing means producing sampling pulse bursts wherein sample pulses within each burst are separated by an interval equal to 1/m cycles of said carrier signal, and wherein the first sampling pulse of each burst is separated from the last sampling pulse of the proceeding burst by an interval equal to N+1/m cycles of said carrier signal, where N and m are non-zero integers.

2. A demodulator as recited in claim 1 wherein N does not remain constant.

3. A demodulator as recited in claim 1 wherein said sampling pulse producing means comprises a microprocessor having interrupt capability.

4. A demodulator as recited in claim 3 wherein all of the sampling pulses in each one of said sampling pulse bursts are initiated by a single interrupt to said microprocessor.

5. A demodulator as recited in claim 3 wherein said microprocessor is operated at a basic clock frequency, and m is selected such that 1/m cycles of said carrier signal is equal to an exact multiple of said basic clock frequency period.

6. A demodulator as recited in claim 1 wherein said comparing means detects either of two phase differences between said phase angle signal and said phase reference signal.

7. A coherent phase demodulator for a carrier signal modulated with digital data by a phase reversal keyed modulation process, comprising:
   means for sampling the instantaneous polarity of said carrier signal, the sampling rate of said sampling means being variable, said sampling means being configured to sample said instantaneous polarity in bursts wherein samples within each of said bursts are separated by a time interval generally equal to 1/m cycles of said carrier signal and the first sample of each of said bursts is separated from the last sample of the previous burst by a time interval equal to N+1/m cycles of said carrier signal, N and m being non-zero integers;
   means connected to said sampling means for deriving a phase reference signal representative of the nominal phase of said carrier signal;
   means connected to said sampling means for deriving a phase angle signal representative of the present phase of said carrier signal; and
   means for comparing said phase reference signal and said phase angle signal to recover said digital data.

8. A method for recovering baseband digital data modulated onto a carrier signal by a phase shift keying process, said method comprising the steps of:
   producing sampling pulses in bursts such that the interval between pulses within each burst is equal to 1/m cycles of said carrier signal and the interval between pulses of adjacent bursts is equal to N+1/m cycles of said carrier frequency, where N and m are non-zero integers;
   determining the polarity of said carrier signal at the instant of each sample pulse;
   producing a polarity sample signal indicative of the polarity of said carrier signal at the instant of each sample pulse;
   using said polarity sample signals to establish a phase angle signal indicative of the present phase of said carrier signal;
   using said polarity sample signals to establish a phase reference signal indicative of the nominal phase of said carrier signal;
   comparing said phase angle signal and said phase reference signal to produce a phase difference signal indicative of the logic state of baseband digital data encoded onto said carrier signal.

9. A method as recited in claim 8 wherein the steps of producing said sample pulses and determining the instantaneous polarity of said carrier signal are performed by a microprocessor.

10. A method as recited in claim 9 wherein said microprocessor has a basic clock frequency and the sample rate for sample pulses within a burst is equal to an exact multiple of said basic clock frequency.

11. A method as recited in claim 8 wherein N is not a constant.

* * * * *